United States Patent

[11] 3,589,648

| [72] | Inventors | John A. Gorham<br>Thousand Oaks;<br>Heinz K. Richter, Los Angeles, both of, Calif. |
|---|---|---|
| [21] | Appl. No. | 788,507 |
| [22] | Filed | Jan. 2, 1969 |
| [45] | Patented | June 29, 1971 |
| [73] | Assignee | Lockheed Aircraft Corporation<br>Burbank, Calif. |

[54] MEANS FOR CONTROLLING THE VERTICAL PATH OF AN AIRCRAFT
7 Claims, 11 Drawing Figs.

| [52] | U.S. Cl. | 244/77 A |
|---|---|---|
| [51] | Int. Cl. | B64c 13/18 |
| [50] | Field of Search | 244/77, 77 A, 77 D, 42.6 |

[56] References Cited
UNITED STATES PATENTS

| 2,627,384 | 2/1953 | Esval | 244/77 (D) |
|---|---|---|---|
| 2,944,768 | 7/1960 | Weber | 244/77 (D) |
| 2,950,076 | 8/1960 | Shirey et al. | 244/77 (D) |
| 3,115,319 | 12/1963 | Glaser et al. | 244/77 (A) |
| 3,126,175 | 3/1964 | Lowell | 244/77 (A) |
| 3,147,424 | 9/1964 | Miller | 244/77 (D) |

*Primary Examiner*—Milton Buchler
*Assistant Examiner*—Jeffrey L. Forman
*Attorneys*—George C. Sullivan and Lowell G. Turner ABSTRACT: A system is described for automatically controlling spoilers in the wing of an aircraft to control the lift, and hence the vertical flight path, of the aircraft. The spoilers are servoed to cause the aircraft to fly at a constant altitude or to ascend or descend at a controlled rate. The invention is particularly useful in an automatic system for controlling the vertical profile of the approach path of an aircraft to an airport.

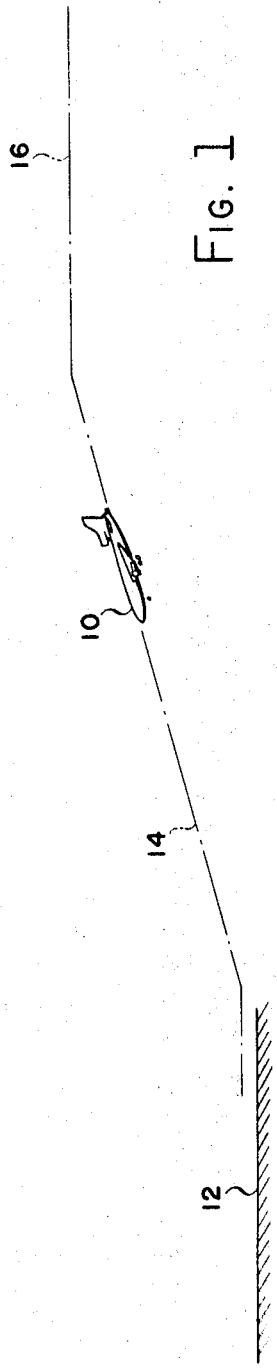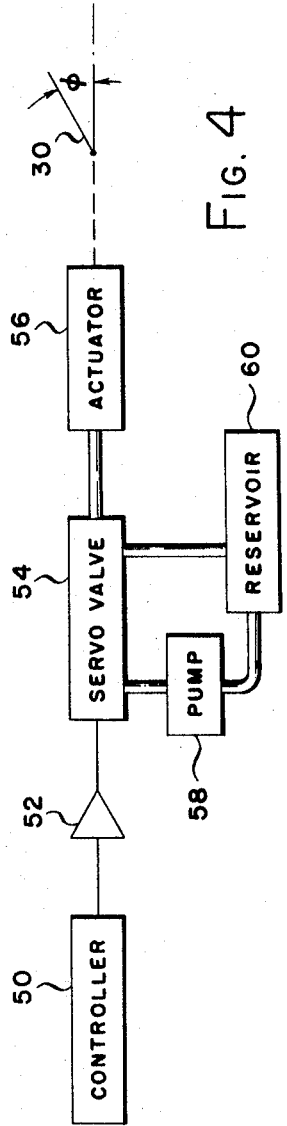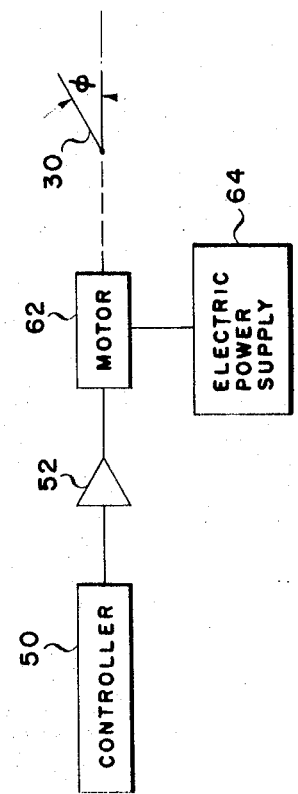

MEANS FOR CONTROLLING THE VERTICAL PATH OF AN AIRCRAFT

BACKGROUND OF THE INVENTION

In a conventional control system for an aircraft as shown, for example, in U.S. Pat. No. 3,015,459 for an "Automatic Control Apparatus," issued Jan. 2, 1962 to Robert C. McLane et al., the descent profile is controlled by modulating the elevators of the aircraft.

Typically the flaps of the aircraft are lowered to increase the lift of the wing, the throttles are set, and the aircraft is flown to the glide slope by varying the angle of attack through the motion of the elevators. Thus, if the aircraft is below the glide slope, the angle of the elevators is increased upward to cause the aircraft to climb toward the glide slope. Similarly, when the aircraft is above the glide path, the elevators are tilted down to cause the aircraft to converge upon the glide path. Unfortunately, particularly with large aircraft, the time for response of the aircraft to the elevators may be in the order of 10 seconds. Further, there is a tendency to overcontrol the elevators, thus causing the aircraft to oscillate or "porpoise" around the glide path. The tendency of the aircraft to be sluggish in answering the control of the elevators can be very critical in terms of safety and accuracy when the aircraft is near the ground. Further the comfort of the passengers is reduced, when a downdraft or updraft is encountered by the aircraft, because it does not respond rapidly enough to the elevators.

It has been proposed heretofore to provide direct lift control (DLC) devices to improve the longitudinal handling qualities of an airplane for manually flown approaches, especially on glide slope. More particularly, the use of spoilers of flaps to provide direct lift control has been proposed for making aircraft-carrier landings. These prior art systems are generally referred to as "three parameter" systems because the pilot must continuously control 1) the throttle setting, 2) the position of the control column, and 3) the spoiler or flap setting, in order to maneuver the airplane along the desired vertical flight path. Although these DLC systems have been considered to improve the accuracy of landing approach, they are deemed to place an unacceptable burden on the pilot by reason of the additional control task which must be performed.

SUMMARY OF THE INVENTION

The present invention comprises a three-parameter direct lift control system for an aircraft, which is automatically controlled by a radio navigation system (or other source of control signals) through the aircraft's autopilot. The additional manual control task imposed on the pilot by prior art DLC systems is overcome in the present invention since the automated system is capable of simultaneously controlling a large number of variables. The automatic operation of the system allows greater flexibility than is available in a manual DLC system, as well as providing other advantages as will be discussed hereinafter.

It is contemplated by this invention that when the aircraft approaches the glide path, not only will the flaps be lowered, but also the spoilers will be partly raised. While the extension of the flaps increases the lift of the wings, the extension of the spoilers tends to reduce the lift of the wings by a small amount.

Output signals from the autopilot/glide path receiver system controls servomotors which actuate the spoilers. The response of the spoilers is very rapid, e.g., on the order of a tenth of a second, and the response of the lift of the aircraft to the position of the spoilers is also very rapid. The change in the output of the glide path receiver is substantially instantaneous as the aircraft moves above or below the glide path.

The use of flight spoilers, in accordance with the invention, for direct lift control during automatic landing operations permits the achievement of a significant improvement in longitudinal touchdown dispersion without paying the usual penalty of a higher touchdown vertical velocity. A better than 2-to-1 decrease in longitudinal dispersion is feasible while retaining nominal touchdown rates of e.g. 1.8 feet per second, with one sigma variations of 0.2 feet per second. The fast responding normal acceleration with spoiler control (although ordinarily limited to about 0.1 g.) permits tightening of the vertical path control loop during flare of the aircraft. This results in an improvement in the vertical velocity touchdown dispersion.

It is recognized that the use of spoilers for direct lift control during landing results in a small increase in the required thrust. However, due to the small change in the drag and the relative insensitivity of noise to the amount of thrust, at the approach thrust level, the increase in thrust causes only an insignificant change in the average noise level. It is a real benefit of this invention that direct lift control minimizes the noise modulation normally associated with automatic speed control.

In a preferred embodiment of this invention, the output signal of the glide path receiver is connected through a servo amplifier which is appropriately compensated (if compensation is needed) to servo or control the angular position of the spoilers from an initial, or biased, position. As the aircraft rises slightly above the glide path, the angle of the spoilers is automatically increased slightly to reduce the lift of the aircraft to cause it to return to the glide path, i.e., the rate of descent is adjusted to cause the aircraft to return to the glide path. As the aircraft reconverges on the glide path, the spoiler angle is reduced. Should the aircraft descend below the glide path, the angle of the spoilers is further reduced to increase the lift of the aircraft.

If desired, compensation may be placed in the servo loop in the form of an integrator so that, for example, should the aircraft tend to hang off of the glide path for a period of time, the biased angle of the spoilers would be increased or decreased from the preset position.

Instead of servoing the spoilers to hold the aircraft to a glide path, as evidenced by the output signal of a glide slope receiver, the aircraft—for example—may be servoed to a constant pressure altitude, constant density altitude, or constant altitude over the surface of the ground (or water). The spoilers may be raised and the flaps might or might not, at the option of the pilot, be partly lowered. The aircraft could then be servoed to the altimeter, an altitude computer, a radio altimeter, or the like. As the aircraft rose from a preset altitude, the spoiler angle would increase, thereby decreasing the lift of the wing. The spoiler angle would decrease, from its preset or biased angle, to increase the lift of the wing when the altitude of the aircraft is dropped below the preset altitude.

The aircraft might also be servoed, if desired, to a predetermined rate of ascent or descent. Various kinds of rate of descent (or ascent) indicators are known which can produce an output which is a measure of the rate of descent or ascent. The desired rate of descent or ascent might then be set into the servo so that the spoilers causes the aircraft to maintain the commanded rate of descent or ascent.

It is further important to note that, with the aid of a stored program, the aircraft may be programmed so that the spoilers of the aircraft control the lift of the aircraft in a fashion to cause the aircraft to follow a programmed altitude or a programmed rate of change of altitude. The program may, for example, be a function of position, a function of time, or a function of some other parameter. The position of the aircraft may be determined by numerous navigation devices, e.g., inertial navigation, Loran, TACAN, and the like.

It is also important to note that the aircraft altitude, or rate of change of altitude may be controlled, through a telemetering link, from the ground. For example, on a precision-approach-radar (PAR) approach to an airport it may be desirable to control the altitude of the aircraft from the ground.

It is therefore an object of this invention to provide novel and improved means for controlling the ascent-descent profile of an aircraft by controlling the aircraft's spoiler angle.

It is another object of this invention to provide novel and improved means for servoing the spoilers of an aircraft to cause the aircraft to follow a predetermined ascent-descent profile.

It is yet another object of this invention to provide novel and improved means for servoing the spoilers of an aircraft to cause the aircraft to automatically follow a predetermined rate of ascent and/or descent.

It is a specific object of this invention to provide novel and improved means for generating a signal which is a measure of the deviation of an aircraft from a particular ascent-descent profile, and to automatically control the lift of the aircraft by controlling the angle of the spoilers to cause the aircraft to follow said profile.

It is another object of this invention to provide novel and improved means for generating a signal which is a measure of the deviation of the rate of ascent-descent of an aircraft from a particular rate of ascent-descent, and to automatically control the lift of the aircraft by controlling the angle of the spoilers to cause the aircraft to maintain said rate of ascent-descent.

Other objects and features of the invention will become apparent, when considered in connection with the following description and the accompanying drawings.

BRIEF DESCRIPTION OF THE DRAWINGS

FIG. 1 shows an aircraft following a glide slope to an airport landing;

FIG. 4 is a block diagram of a hydraulic servosystem adapted to control the spoilers;

FIG. 5 is a block diagram of an electrical servosystem adapted to control the spoilers;

DETAILED DESCRIPTION OF THE PREFERRED EMBODIMENTS

Figure 2:
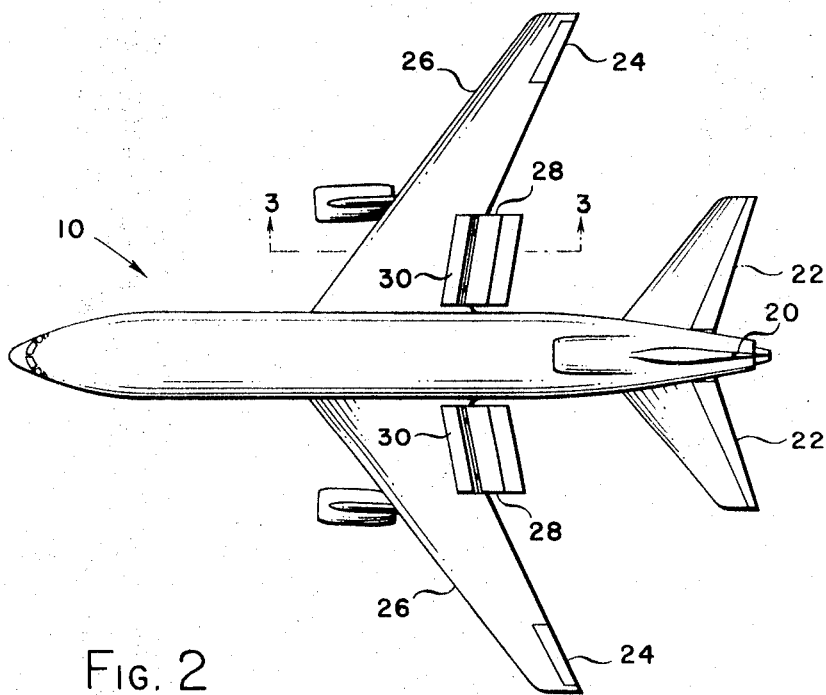
FIG. 2 is a plan view of a typical aircraft, showing the control surfaces, including the spoilers, of the aircraft.
Figure 3:
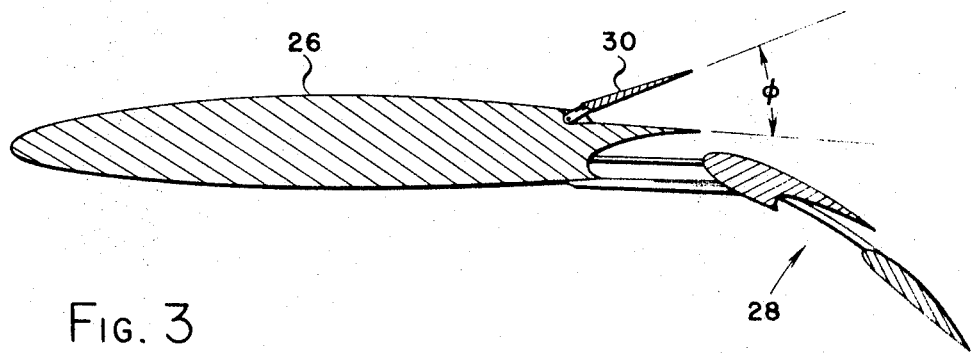
FIG. 3 is a sectional view, taken at line 3—3 in FIG. 2, showing the flaps extended and the spoilers partly raised.

In FIG. 1 is shown an aircraft 10 approaching an airport runway 12 along a glide path 14 from a cruising path 16. The glide path 14 is usually established for each airport by a glide path transmitter (not shown). Typically the glide path approaches the earth at an angle on the order of 3° from the horizontal.

On the aircraft 10 is a glide slope receiver 100 which senses whether the aircraft 10 is above, below, or on the glide path 14 (see FIG. 6).

In modern jet transports, spoilers may be found on the upper surface of the wing. These top-of-wing spoilers are normally used by the pilot to reduce the lift of the aircraft once the reaching of the runway is assured and to prevent floating of the aircraft above the runway either after touchdown or during an aborted takeoff.

A plan view of the aircraft 10 is shown in FIG. 2. The aircraft 10 typically has a rudder 20 for controlling the yaw of the aircraft, elevators 22 for controlling the pitch of the aircraft, and ailerons 24 for controlling the roll of the aircraft. Upon the wings 26, in addition to the ailerons 24, are found the flaps 28 and the spoilers 30.

The spoilers 30 are control surfaces, frequently slotted or perforated, which are adapted to be projected upward into the airstream to reduce the lift. In actual practice, there may be more than one spoiler on each wing. In fact, there may be one set of spoilers, called ground spoilers, which are adapted either to be retracted or to be fully extended to prevent the aircraft from balooning or lifting off of the runway. The spoilers used in this invention may conveniently be called flight spoilers, for they are adapted to be used in flight of the aircraft to control the ascent-descent profile of the aircraft. The flight spoilers are adapted to be controlled continuously upon energizing of the spoiler control system.

Initially the angle of the flight spoilers 30 is set to some bias angle $\Phi_o$ so that control of the spoiler angle $\Phi$ may be in either sense, i.e., to increase or decrease the spoiler angle $\Phi$ from $\Phi_o$ position. It is customary to extend the flaps 28 to increase the lift of the wing at the same time the spoiler angle is moved from its zero position into its $\Phi_o$ position.

A typical hydraulic or pneumatic servocontrol system is shown in FIG. 4. A controller 50 generates a signal which is amplified by amplifier 52 to control a hydraulic or pneumatic servo valve 54. The servo valve 54 controls the pressure and flow of hydraulic or pneumatic fluid from the pump 58 to the actuator 56. The actuator 56 may be a typical hydraulic actuator with a piston which controls the angular motion of the spoiler 30. Typically, when further increase of the spoiler angle $\Phi$ is required, the servo valve 54 allows the pump 58 to deliver additional fluid from the reservoir 60 to the actuator 56. When the spoiler angle is to be decreased, the servo valve 54 allows fluid to return from the actuator 56 to the reservoir 60.

Alternatively, as shown in FIG. 5, the spoiler angle $\Phi$ may be controlled by an electric motor or actuator 62 which receives its energy from an electric power supply 64.

Figure 6:
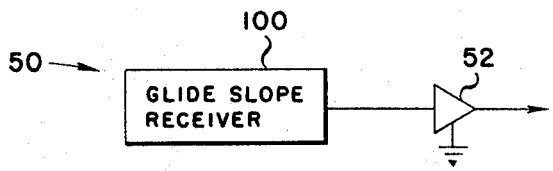
FIG. 6 is a block diagram showing typical connection of the system to a glide slope receiver.
Figure 7:
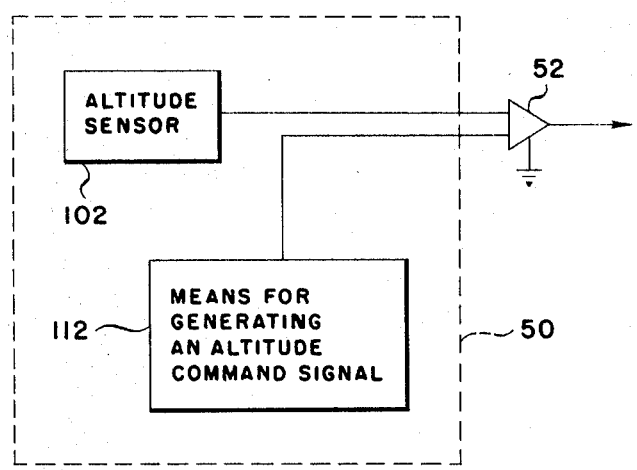
FIG. 7 is a block diagram showing typical connection of the system to an altitude sensor.
Figure 8:
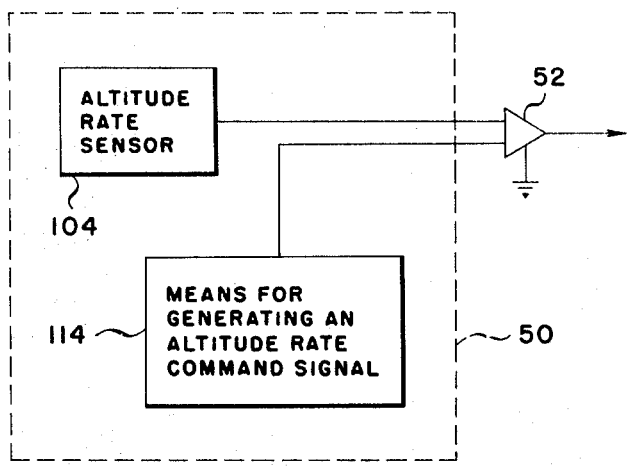
FIG. 8 is a block diagram showing typical connection of the system to an altitude rate sensor.

Typical examples of the controllers 50 and their connection to the amplifier 52 are shown in FIGS. 6, 7, and 8.

In FIG. 6 is shown a glide slope receiver 100 having no electrical output when the aircraft 10 is on the glide path 14. The electrical output of the receiver 100 is of a first polarity when the aircraft 10 is above the glide path 14; it is of a second polarity when the aircraft 10 is below the glide path. Thus, when the aircraft 10 is on the glide path, the amplifier 52 sends no signal to the servo valve 54 or the motor 62, indicating that the spoiler angle $\Phi$ is exactly right. When the aircraft 10 is above the glide path 14, the amplifier 52 sends a signal to the servo valve 54 or the motor 62 which is of the correct polarity to cause the valve 54 or motor 62 to be actuated in a direction to cause the spoiler angle $\Phi$ to increase, thus reducing the lift of the aircraft 10 and returning it to the glide slope 14. When the aircraft 10 is below the glide path 14, the amplifier 52 sends a signal to the servo valve 54 or the motor 62 which is of the correct polarity to cause the valve 54 or motor 62 to be actuated in a direction to cause the spoiler angle $\Phi$ to decrease, thus increasing the lift of the aircraft 10 and returning it to the glide slope 14.

Typically, the initial spoiler angle $\Phi_o$ and the flaps are set during the cruise flight 16 immediately before intercepting the glide slope 14. The spoiler control system is then actuated to cause the aircraft to follow or "lock on" the glide slope.

Should it be desired to servo the aircraft altitude either to a ground command or a programmed altitude (as controlled e.g. by a computer), a configuration of the controller, shown in FIG. 7, may be used. The altitude sensor 102 may, for example, be a barometric altimeter, a radar altimeter, a laser altimeter, or other altitude measuring device which is adapted to produce a signal which is a measure of altitude. A command signal is introduced from means 112 into a difference means such as the servoamplifier 52 (which may be, e.g, a summing-type amplifier) with a sense or polarity such that when the altitude of the aircraft 10 is at the commanded altitude, no output signal is delivered to the servo valve 54 or the motor 62, indicating that the spoiler angle $\Phi$ is exactly right. When the signal of the altimeter is too high, the servo valve 54 or motor 62 is commanded to increase the spoiler angle $\Phi$, thus decreasing the lift of the aircraft and reducing its altitude.

When the signal of the altimeter is too low, the servo valve 54 or motor 62 is commanded to decrease the spoiler angle Φ, thus increasing the lift of the aircraft and increasing its altitude.

Figure 9:
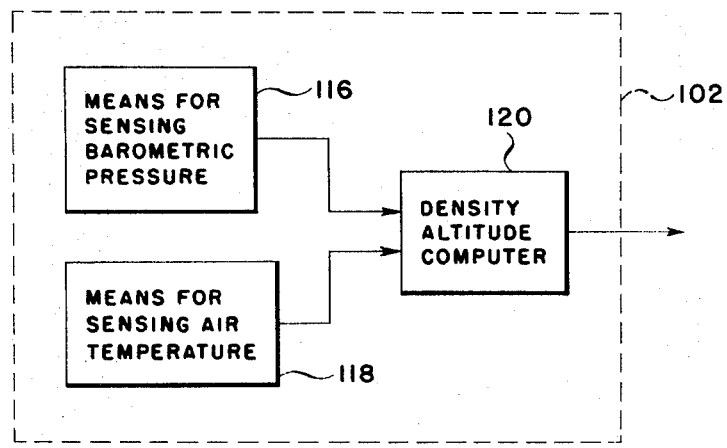
FIG. 9 is a block diagram showing a typical altitude sensor adapted to produce a signal indicative of the density altitude of an aircraft.

Typical means for obtaining density altitude of the aircraft 10 are shown in FIG. 9. The density altitude is a function of both the barometric pressure and the temperature of the air outside of the aircraft. A means 116, such as a static pressure transducer with an electrical output which is a measure of barometric pressure may be used to create one of the inputs to the density altitude computer 120. The temperature input to computer 120 may be obtained from a thermometer having an electrical output which is a measure of the air temperature outside of the aircraft 10.

Should it be desired to servo the rate of change of the aircraft altitude either to a ground command or a programmed rate of change, a configuration of the controller shown in FIG. 8 may be used. The altitude rate sensor 104 may, for example, be a barometric rate-of-climb indicator, a Doppler rate of descent indicator, or other altitude rate measuring device which is adapted to generate an electrical signal indicative of the rate of change of the altitude of the aircraft 10. A command signal is introduced from means 114 into a difference means such as the servoamplifier 52 (which may be a summing amplifier) with a sense such that when the aircraft is ascending or descending at the commanded rate, no output signal is delivered by amplifier 52 to the valve 54 or the motor 62, indicating that the spoiler angle Φ is exactly right. When the signal of the rate sensor 104 indicates that the rate of ascent is too high or that the rate of descent is too low, the servo valve 54 or motor 62 is commanded to increase the spoiler angle Φ, thus decreasing the lift of the aircraft 10 to reduce its rate of ascent or increase its rate of descent, respectively. When the rate sensor 104 indicates that the rate of ascent is too low or that the rate of descent is too high, the servo valve 54 or motor 62 is commanded to decrease the spoiler angle Φ, thus increasing the lift of the aircraft 10 to increase its rate of ascent or decrease its rate of descent, respectively.

Figure 10:
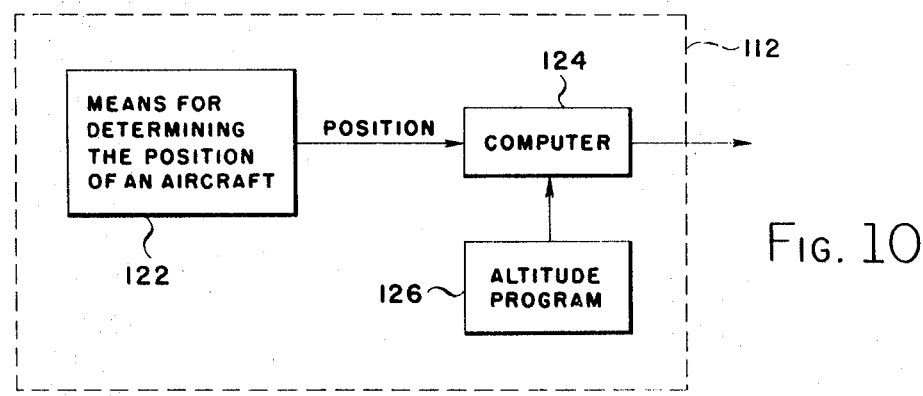
FIG. 10 is a block diagram of a typical means for generating an altitude command signal.

A means for generating an altitude command signal 112 may comprise, as shown in FIG. 10, a means for determining the position of an aircraft 122, delivering position signals to a computer 124 which contains an altitude program 126 as a function of position of the aircraft 10.

Figure 11:
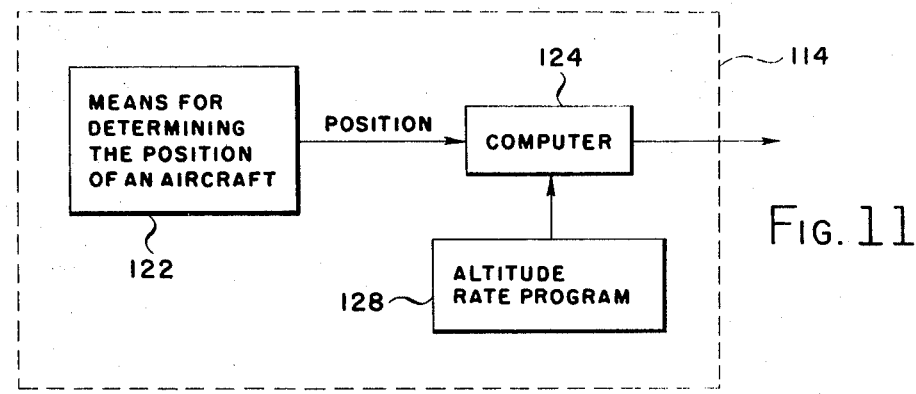
FIG. 11 is a block diagram of a typical means for generating an altitude rate command signal.

Similarly, a means for generating an altitude rate command signal 114 may comprise, as shown in FIG. 11, a means for determining the position of an aircraft 122, delivering position signals to a computer 124 which contains an altitude rate program 128 as a function of position of the aircraft 10.

In the embodiment of FIG. 10, the means for determining the position of the aircraft may comprise a glide slope receiver of the type indicated at 100 in FIG. 6 and the altitude program 126 may be obtained from a radio or radar altimeter. Computer 124 is made responsive to the glide slope receiver as the source of the primary error signal during the approach descent of the aircraft down to an altitude of approximately 50 feet after which the computer 124 responds to the radar altimeter (122) as the source of the primary error signal. This later phase of the descent, during which the altitude input is obtained from the radar altimeter, comprises the flare profile. Typically, the sink rate of the aircraft at the time of commencement of the flare profile, while under primary control of the glide slope receiver (122), is in the order of 10 feet per second. During the flare profile and up to the time of touchdown the sink rate is typically in the order of 2½ feet per second. Thus, the system shown in FIG. 10 permits the glide slope receiver signal to override the radar altimeter signal for controlling the spoiler angle until a given altitude is reached, after which the radar altimeter signal becomes the dominant control signal. Computers suitable for performing the functions of computer 124 are well known to those versed in the art and may, for example, be of the type shown and described in U.S. Pat. No. 2,998,946 to Jude et al., entitled "Aircraft Automatic Pilot" and U.S. Pat. No. 3,015,459 to McLane et al., entitled "Automatic Control Apparatus."

It is apparent that numerous well-known devices, such as an inertial navigation system, a satellite navigation system, LORAN, TACAN, and others, may be used as the means for determining the position of an aircraft 122.

It is also apparent that all computers may be analog, digital, DDA, or hybrid computers at the discretion of the designer.

Thus, the device of this invention is adapted rapidly to control the lift of an aircraft, particularly in response to a control signal which controls the ascent-descent profile of the aircraft. The device of this invention likely will find its best use in controlling the vertical descent of an aircraft as it approaches an airport with resultant minimizing of bouncing of the aircraft and maximizing of the accuracy of landing. As used in an automatic landing mode, the servo-controlled DLC system of the invention will maneuver the aircraft along the glide path with the pitch attitude held through the autopilot in a conventional manner. Thus, for automatic landings the two functions might be considered as essentially separate functions with a minimum of interaction.

Although the invention has been described above in detail, it is not intended that the invention should be limited by that description, but only in accordance with the appended claims.

We claim:

1. Apparatus for sequentially controlling the vertical flight path of an aircraft through the stages of descent, flare out, and touchdown, comprising:
    a plurality of adjustable spoilers, mounted at the upper surface of the wings of said aircraft for selectively controlling the lift thereof;
    a hydraulic actuator connected to each of said spoilers for raising, lowering, and holding said spoilers in a selected position;
    means normally biasing each of said spoilers to a position approximately midway through its range of adjustment in response to the activation of said flight control apparatus at the commencement of said descent stage;
    a pump for supplying hydraulic fluid under pressure to said actuators;
    a servo valve, adapted to be electrically actuated in response to servocontrol signals, connected in series with said pump and a hydraulic reservoir to said actuators to control the position of said actuators and said spoilers;
    a glide-slope receiver responsive to a ground-based radio transmitter to produce glide-slope position signals which are a measure of the vertical displacement above and below the predetermined radio glide path generated by said transmitter;
    an altitude sensor for producing altitude signals indicative of the altitude of said aircraft above the surface of the earth;
    computer means having first and second inputs connected to said glide-slope receiver and to said altitude sensor, respectively, and having an output connected to said servo valve, said computer being responsive to the combination of said glide-slope position signals and said altitude signals, it being primarily responsive to said glide-slope position signals during said descent stage when said aircraft is above a given altitude and thereafter primarily responsive to said altitude signals during said flare out and touchdown stages when said aircraft is below said given altitude, for generating said servocontrol signals for said servo valve, whereby the lift of said wings is continuously controlled by the output of said computer means through said descent, flare out, and touchdown stages.

2. Apparatus according to claim 1 in which said altitude sensor comprises:
    means for measuring and producing a signal indicative of the barometric pressure of the air surrounding said aircraft;
    means for measuring and producing a signal indicative of the temperature of the air surrounding said aircraft; and a density altitude computer connected to receive signals from said pressure and said temperature measuring means, and adapted to produce a signal which is a measure of the density altitude of said aircraft.

3. Apparatus according to claim 1 in which said altitude sensor comprises:
a radio altimeter, adapted to produce signals indicative of the altitude of said aircraft over the surface of the earth.

4. Apparatus according to claim 1 wherein said computer means includes a third input, and including:
an altitude rate sensor adapted to generate signals indicative of the rate of ascent and descent of said aircraft;
means for generating an altitude rate command; and
difference signal generating means connected to said third input of said computer means and responsive to the signals from said rate sensor and said means for generating a command signal, to produce a difference signal which is a measure of the difference between said commanded rate and the rate sensed by said rate sensor.

5. Apparatus according to claim 4 in which said means for generating an altitude rate command comprises:
means for determining the vertical position of said aircraft; and
translating means for receiving signals from said means for determining the vertical position of said aircraft, and translating said position signals into altitude rate command signals.

6. Apparatus according to claim 4 in which said rate sensor is a barometric rate sensor.

7. Apparatus according to claim 4 in which said rate sensor is a Doppler radio altitude rate sensor.